(12) United States Patent
Gädt et al.

(10) Patent No.: US 9,796,628 B2
(45) Date of Patent: *Oct. 24, 2017

(54) ADDITIVE FOR HYDRAULICALLY SETTING COMPOSITIONS

(71) Applicant: Construction Research & Technology, GmbH, Trostberg (DE)

(72) Inventors: Torben Gädt, Traunstein (DE); Harald Grassl, Feichten (DE); Luc Nicoleau, Ludwigshafen am Rhein (DE); Joachim Dengler, Tacherting (DE); Martin Winklbauer, Halsbach (DE)

(73) Assignee: Construction Research & Technology, GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/111,213

(22) PCT Filed: Jan. 20, 2015

(86) PCT No.: PCT/EP2015/050917
§ 371 (c)(1),
(2) Date: Jul. 13, 2016

(87) PCT Pub. No.: WO2015/110393
PCT Pub. Date: Jul. 30, 2015

(65) Prior Publication Data
US 2016/0332914 A1 Nov. 17, 2016

(30) Foreign Application Priority Data
Jan. 22, 2014 (EP) .................................... 14152156

(51) Int. Cl.
| | | |
|---|---|---|
| *C04B 24/30* | (2006.01) | |
| *C04B 24/26* | (2006.01) | |
| *C04B 28/02* | (2006.01) | |
| *C04B 22/06* | (2006.01) | |
| *C04B 22/08* | (2006.01) | |
| *C04B 22/16* | (2006.01) | |
| *C04B 103/30* | (2006.01) | |
| *C04B 103/40* | (2006.01) | |

(52) U.S. Cl.
CPC ............ *C04B 24/30* (2013.01); *C04B 22/062* (2013.01); *C04B 22/085* (2013.01); *C04B 22/16* (2013.01); *C04B 24/267* (2013.01); *C04B 24/2629* (2013.01); *C04B 24/2647* (2013.01); *C04B 24/2658* (2013.01); *C04B 24/305* (2013.01); *C04B 28/02* (2013.01); *C04B 2103/308* (2013.01); *C04B 2103/408* (2013.01)

(58) Field of Classification Search
CPC ..... C04B 22/30; C04B 22/062; C04B 22/085; C04B 22/16; C04B 24/2629; C04B 24/30; C04B 24/2647; C04B 28/02; C04B 24/305
See application file for complete search history.

(56) References Cited

U.S. PATENT DOCUMENTS

| | | |
|---|---|---|
| 7,879,146 B2 | 2/2011 | Raki et al. |
| 9,315,419 B2 | 4/2016 | Gädt et al. |
| 2012/0046393 A1 | 2/2012 | Cha et al. |
| 2015/0158768 A1* | 6/2015 | Gadt .................. C04B 24/2629 524/5 |

FOREIGN PATENT DOCUMENTS

| | | |
|---|---|---|
| EP | 2412689 | 2/2012 |
| EP | 2687498 | 1/2014 |
| WO | WO 2009/004348 | 1/2009 |

OTHER PUBLICATIONS

International Search Report, PCT/EP2015/050917, dated Mar. 5, 2015.
International Written Opinion, PCT/EP2015/050917, dated Mar. 5, 2015.

* cited by examiner

*Primary Examiner* — John Uselding
(74) *Attorney, Agent, or Firm* — Curatolo Sidoti Co., LPA; Joseph G. Curatolo; Salvatore A. Sidoti

(57) ABSTRACT

The present invention relates to an additive for hydraulically setting compositions, comprising a colloidally disperse preparation of at least one salt of a mono- or polyvalent metal cation and of at least one compound which is able to release an anion which forms a low-solubility salt with the metal cation, and of at least one polymeric sulphonated dispersant. The additive is suitable particularly as a slump retainer.

20 Claims, No Drawings

ADDITIVE FOR HYDRAULICALLY SETTING COMPOSITIONS

CROSS REFERENCE TO RELATED APPLICATIONS

This application is a national stage application of International Application No. PCT/EP2015/050917, filed 20 Jan. 2015, which claims priority from European Patent Application No. 14152156.7, filed 22 Jan. 2014, which applications are incorporated herein by reference.

The invention relates to an additive for hydraulically setting compositions which is suitable particularly as a slump retainer.

Hydraulically setting compositions comprising aqueous slurries of hydraulic and/or mineral binder with pulverulent organic and/or inorganic substances, such as clays, finely ground silicates, chalks, carbon blacks, or finely ground minerals, find broad application in the form, for example, of concretes, mortars or plasters.

It is known that hydraulically setting compositions are admixed, for the purpose of improving their processing properties—that is, kneadability, spreadability, sprayability, pumpability or fluidity—with additives which comprise polymeric dispersants. Additives of this kind are able to prevent the formation of agglomerates of solids, to disperse existing particles and those newly formed by hydration, and in this way to improve the processing properties. Additives which comprise polymeric dispersants are also particularly used specifically in the preparation of hydraulically setting compositions which comprise hydraulic and/or mineral binders such as (Portland) cement, slag sand, flyash, silica dust, metakaolin, natural pozzolans, burnt oil shale, calcium aluminate cement, lime, gypsum, hemihydrate, anhydrite or mixtures of two or more of these components.

In order to bring these hydraulically setting compositions, based on the stated binders, into a ready-to-use, processable form, it is generally necessary to use substantially more mixing water than is necessary for the subsequent hardening process. In the concrete structure, the cavities that are formed by the excess water, which subsequently evaporates, reduce the mechanical strength and resistance.

In order to reduce the fraction of excess water for a given processing consistency, and/or to improve the processing properties for a given water/binder ratio, additives are used which are identified generally as water reducers or plasticizers. Water reducers or plasticizers used in practice are more particularly polymers which are obtained by radical polymerization and are based on carboxyl-containing monomers and on polyethylene glycol-containing olefinic monomers, these polymers also being referred to as polycarboxylate ethers (abbreviated to "PCEs"). These polymers have a carboxyl-containing main chain with polyethylene glycol-containing side chains, and are also identified as comb polymers. A further class of important plasticizers are based on polycondensates containing sulfonic acid. Examples might include beta-naphthalenesulfonate-formaldehyde condensates (BNS), sulfonated melamine-formaldehyde condensates or acetone-formaldehyde condensates. Also suitable as plasticizers are lignosulfonates, which are obtained as a by-product of paper making.

Divided off from the water reducers and plasticizers, which produce plasticization of freshly prepared concrete when added in relatively low amounts, are the consistency agents or slump-maintaining additives, referred to below as slump retainers, which achieve the same initial plasticization, only when added at relatively high levels, but bring about a constant slump flow spread over time. In contrast to the addition of water reducers, the addition of slump retainers allows good processing properties to be extended for up to, for example, 90 minutes after the mixing of the concrete, whereas with water reducers the processing properties deteriorate significantly after usually just 10 to 30 minutes.

In the art, generally speaking, water reducers and slump retainers are used in varying proportions in formulations. By means of formulating measures, however, the possibilities of improving slump retention are only very limited, it being difficult in particular to improve slump retention without at the same time adversely affecting other properties of the concrete. For instance, a formulation with slump retainers does result in better slump retention, as disclosed for example in WO 2009/004348 in connection with phosphonates and in JP 57067057A in connection with sugars. However, the retention of the slump is bought only at the expense of poorer early strengths.

One considerable disadvantage of sulfonated dispersants is their extremely weak maintenance of concrete processability over time. In particular, it is not possible to remedy this disadvantage by synthetic measures, as is the case for comb polymers. One more recent approach is to formulate BNS with dispersants containing acrylic ester. Accordingly, US 2013/0231415 describes the formulation of BNS with PEG-free dispersants containing hydroxyethyl acrylate. A disadvantage of this approach, however, is that the corresponding post-plasticizing polymers are significantly more expensive than BNS or other sulfonated dispersants. Moreover, the polymers have retardant properties and are therefore detrimental to the development of early strength in the concrete.

U.S. Pat. No. 7,879,146 B2 discloses the preparation of double layer hydroxides based on divalent metal cations (e.g. $Ni^{2+}$, $Zn^{2+}$, $Mn^{2+}$ and/or $Ca^{2+}$) and trivalent metal cations (e.g. $Al^{3+}$, $Ga^{3+}$, $Fe^{3+}$ and/or $Cr^{3+}$). The double layer hydroxides are able to intercalate anions such as nitrates, hydroxides, carbonates, sulfates and chlorides. The inorganic products are treated at elevated temperature (65° C.) for a number of hours and then dried under reduced pressure at 100° C. In a subsequent ion exchange operation, organic molecules are intercalated into the thus-prepared double layer hydroxides, examples of such molecules being naphthalenesulfonates, derivatives of nitrobenzoic acid, salicylic acid, citric acid, polyacrylic acids, polyvinyl alcohol and a superplasticizer based on a sodium salt of polynaphthalenesulfonic acid (PNS). The polynaphthalenesulfonic acid (PNS) sodium salts modified inorganically by double layer hydroxides produce only a slightly improved slump retention in a mortar test. For many applications, this improvement is not sufficient.

EP 2 412 689 describes a wholly analogous approach for the combination of layered double hydroxide and a polyurethane copolymer. Disadvantageous are the long synthesis times of >6 h and the required high temperatures of 80 to 100° C. for the hydrothermal preparation of the double layer hydroxides. Furthermore, with this method as well, the properties of the hybrid are necessarily laid down in a complicated synthesis procedure in a chemical production plant.

American Concrete Institute, SP (1997), 225-248 describes the coprecipitate of Ca(OH)2, sodium beta-naphthalenesulfonate-formaldehyde condensate and sodium aluminate. Under the conditions described, LDH structures intercalated with BNS are formed, as shown by XRD and SEM investigations.

Guisuanyan Xuebao (2009), 37(7), 1103-1109 and CN 101337785 describe the synthesis of Mg—Al double layer hydroxides intercalated with BNS, which are obtained in a manner similar to U.S. Pat. No. 7,879,146. The described effect of processability maintenance is very small, and for many applications it is inadequate.

Zairyo (1987), 36(405), 617-23 describes the reaction of $Ca(OH)_2$ and Al tris(isopropoxide) in the presence of BNS. The resultant BNS-containing hydrate phases show no effect on the contraction that accompanies drying.

DE 26 09 703 describes organocalcium aluminates based on a calcium salt of an aryl- or alkarylsulfonic acid, which may optionally have been condensed with formaldehyde, and the use thereof as plasticizers for hydraulic binders.

The diverse requirements imposed on the performance profile of concretes are subject to nationally specific regulations and standardizations, and are heavily dependent on the conditions prevailing at the particular building site, such as the weathering conditions, for instance. Slump retention in particular is heavily dependent on the conditions prevailing at the respective construction site.

Since the weathering conditions prevailing from one construction site to another may be very different, there is a need within the construction industry to eliminate the above-described deficiencies of the prior art. The invention is therefore based on the object of providing efficient slump retainers. These slump retainers ought to be able to ensure sufficient slump retention under the conditions prevailing on the construction site, without adversely affecting other concrete properties, such as the early strength, for example.

This object is achieved in accordance with a first embodiment by an

1. Additive for hydraulically setting compositions, comprising a colloidally disperse preparation of at least one salt of at least one mono- or polyvalent metal cation, of at least one compound which is able to release an anion which forms a low-solubility salt with the metal cation, and of at least one dispersant comprising a polymeric sulfonated dispersant having anionic and/or anionogenic groups, where the metal cation is selected from
$Ca^{2+}$, $Al^{3+}$, $Fe^{3+}$, $Fe^{2+}$, $Zn^{2+}$, $Mn^{2+}$, $Cu^{2+}$, $Mg^{2+}$, $Sr^{2+}$, $Ba^{2+}$, $Li^+$ and mixtures thereof, and the metal cation is present in a quantity corresponding to the following formula (a):

$$0.1 < \frac{\sum_i z_{K,i} * n_{K,i}}{\sum_j z_{S,j} * n_{S,j}} < 30 \qquad (a)$$

where
$z_{K,i}$ is the amount of the charge number of the metal cation,
$n_{K,i}$ is the number of moles of the weighed-in metal cation,
$z_{S,j}$ is the amount of the charge number of the anionic and anionogenic groups present in the polymeric dispersant,
$n_{S,j}$ is the number of moles of the anionic and anionogenic groups present in the weighed-in polymeric sulfonated dispersant,
the indices i and j are independent of one another and are an integer greater than 0, where i is the number of different kinds of polyvalent metal cations and j is the number of different kinds of anionic and anionogenic groups present in the polymeric dispersant, where z is defined such that the charge number for cations is always based on the full formal charge, i.e. $z_{Fe}(FeCl_3)=3$, $z_{Fe}(FeCl_2)=2$. z stands for the amount of the formal charge of the anions on maximum deprotonation, i.e. $z_{PO4}(H_3PO_4)=z_{PO4}(Na_3PO_4)=3$, or $z_{CO3}(Na_2CO_3)=2$. In the case of aluminate, $z_{AlO2}(NaAlO_2)=z_{AlO2}(NaAl(OH)_4)=1$; in the case of silicate, $z_{SiO3}(Na_2SiO_3)=2$ for all silicate species.

2. Additive according to embodiment 1, where the metal cation is selected from $Ca^{2+}$, $Mg^{2+}$, $Al^{3+}$, $Fe^{3+}$, $Fe^{2+}$, $Mn^{2+}$, $Zn^{2+}$, $Li^+$ and mixtures thereof.

3. Additive according to embodiment 1, where the metal cation is selected from $Ca^{2+}$, $Mg^{2+}$, $Al^{3+}$, $Fe^{3+}$, $Fe^{2+}$ and mixtures thereof.

4. Additive according to embodiment 1, where the metal cation is selected from $Ca^{2+}$, $Mg^{2+}$, $Al^{3+}$, $Fe^{3+}$ and mixtures thereof.

5. Additive according to embodiment 1, where the metal cation is $Ca^{2+}$.

6. Additive according to any of the preceding embodiments, where the ratio according to formula (a) is in the range from 0.5 to 30, preferably 1 to 10.

7. Additive according to embodiment 6, where the ratio according to formula (a) is in the range from 1 to 8 or 1.1 to 8, preferably 1 to 6 or 1.1 to 6 or 1.2 to 6.

8. Additive according to embodiment 6 or 7, where the ratio according to formula (a) is in the range from 1.01 to 5 or 1.1 to 5 or 1.2 to 5 or 1.25 to 5.

9. Additive according to any of the preceding embodiments, where the anion is present in an amount corresponding to the following formula (b):

$$0.01 \leq \frac{\sum_l z_{A,l} \cdot n_{A,l}}{\sum_i z_{K,i} \cdot n_{K,i}} < 3 \qquad (b)$$

where
$z_{K,i}$ is the amount of the charge number of the polyvalent metal cation,
$n_{K,i}$ is the number of moles of the weighed-in polyvalent metal cation,
$z_{A,l}$ is the charge number of the weighed-in anion,
$n_{A,l}$ is the number of moles of the weighed-in anion,
the indices i, and l are independent of one another and are an integer greater than 0, i is the number of different kinds of metal cations and l is the number of different kinds of anions which are able to form a low-solubility salt with the metal cation.

10. Additive according to embodiment 9, where the ratio according to formula (b) is in the range from 0.01 to 2, preferably 0.1 to 1.5.

11. Additive according to any of the preceding embodiments, where the anion is selected from aluminate, ferrate, carbonate, oxalate, silicate, phosphate, polyphosphate, phosphite, borate, sulfate and mixtures thereof.

12. Additive according to embodiment 11, where the anion is selected from aluminate, ferrate, carbonate, silicate, phosphate and mixtures thereof.

13. Additive according to embodiment 12, where the anion is aluminate.

14. Additive according to embodiment 13, where the ratio according to formula (b) is in the range from 0.01 to 2, more particularly 0.1 to 1.

15. Additive according to any of the preceding embodiments, where the sulfonated polymeric dispersant is selected from sulfonated ketone-formaldehyde condensates, sulfonated melaminesulfonate-formaldehyde condensates, naphthalenesulfonate-formaldehyde condensates, more particularly β-naphthalenesulfonate-formaldehyde condensates and lignosulfonates.

16. Additive according to any of the preceding embodiments, where the sulfonated polymeric dispersant is a sulfonated ketone-formaldehyde condensate, more particularly a sulfonated acetone-formaldehyde condensate, a sulfonated cyclohexanone-formaldehyde condensate or a lignosulfonate.

17. Additive according to any of the preceding embodiments, further comprising at least one neutralizing agent.

18. Additive according to embodiment 17, where the neutralizing agent is an organic aliphatic monoamine, aliphatic polyamine, alkali metal hydroxide, in particular sodium or potassium hydroxide, or ammonia.

19. Additive according to embodiment 18, where the neutralizing agent is selected from ammonia, mono-hydroxy-$C_1$-$C_4$ alkylamines, di-hydroxy-$C_1$-$C_4$ alkylamines, tri-hydroxy-$C_1$-$C_4$ alkylamines, mono-$C_1$-$C_4$ alkylamines, di-$C_1$-$C_4$ alkylamines, tri-$C_1$-$C_4$ alkylamines, $C_1$-$C_4$ alkylenediamines, (tetra-hydroxy-$C_1$-$C_4$ alkyl)-$C_1$-$C_4$ alkylenediamines, polyethylenimines, polypropylenimines and mixtures thereof.

20. Additive according to embodiment 19, where the neutralizing agent is selected from ammonia, mono-hydroxy-$C_1$-$C_4$ alkylamines, di-hydroxy-$C_1$-$C_4$ alkylamines, tri-hydroxy-$C_1$-$C_4$ alkylamines, $C_1$-$C_4$ alkylenediamines, and polyethylenimines.

21. Additive according to embodiment 20, where the neutralizing agent is selected from ammonia, ethylenediamine, monoethanolamine, diethanolamine, triethanolamine and polyethylenimines.

22. Additive according to any of the preceding embodiments, having a pH of 2 to 13, preferably 6 to 12 and more particularly 9 to 11.5.

23. Additive according to any of the preceding embodiments, where the additive additionally comprises at least one polymeric dispersant (comb polymer) comprising anionic and/or aniogenic groups and polyether side chains.

24. Additive according to embodiment 23, where the comb polymer comprises as anionic or anionogenic group at least one structural unit of the general formulae (Ia), (Ib), (Ic) and/or (Id):

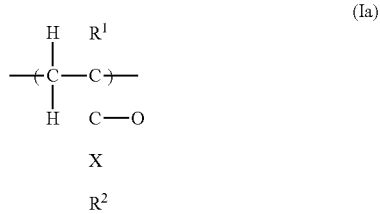
(Ia)

in which $R^1$ is H or an unbranched or branched $C_1$-$C_4$ alkyl group, $CH_2COOH$ or $CH_2CO$—X—$R^2$, preferably H or $CH_3$;

X is NH—$(C_nH_{2n})$, $O(C_nH_{2n})$ with n=1, 2, 3 or 4, where the nitrogen atom or the oxygen atom is bonded to the CO group, or is a chemical bond, preferably X is chemical bond or $O(C_nH_{2n})$;

$R^2$ is OM, $PO_3M_2$, or O—$PO_3M_2$, with the proviso that X is a chemical bond if $R^2$ is OM;

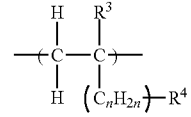
(Ib)

in which $R^3$ is H or an unbranched or branched $C_1$-$C_4$ alkyl group, preferably H or $CH_3$;
n is 0, 1, 2, 3 or 4, preferably 0 or 1;
$R^4$ is $PO_3M_2$, or O—$PO_3M_2$;

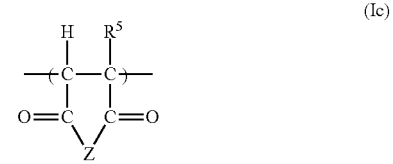
(Ic)

in which $R^5$ is H or an unbranched or branched $C_1$-$C_4$ alkyl group, preferably H;
Z is O or $NR^7$, preferably O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$, and
n is 1, 2, 3 or 4, preferably 1, 2 or 3;

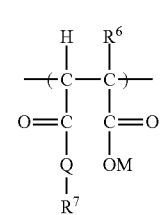
(Id)

in which $R^6$ is H or an unbranched or branched $C_1$-$C_4$ alkyl group, preferably H;
Q is $NR^7$ or O, preferably O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$,
n is 1, 2, 3 or 4, preferably 1, 2 or 3; and
each M independently of any other is H or a cation equivalent.

25. Additive according to embodiment 24, where the comb polymer comprises as anionic or anionogenic group at least one structural unit of the formula (Ia) in which $R^1$ is H or $CH_3$; and/or at least one structural unit of the formula (Ib) in which $R^3$ is H or $CH_3$; and/or at least one structural unit of the formula (Ic) in which $R^5$ is H or $CH_3$ and Z is O; and/or at least one structural unit of the formula (Id) in which $R^6$ is H and Q is O.

26. Additive according to embodiment 24, where the comb polymer comprises as anionic or anionogenic group at least one structural unit of the formula (Ia) in which $R^1$ is H or $CH_3$ and $XR^2$ is OM or X is $O(C_nH_{2n})$ with n=1, 2, 3 or 4, more particularly 2, and $R^2$ is O—$PO_3M_2$.

27. Additive according to any of embodiments 23 to 26, where the comb polymer comprises as polyether side chain at least one structural unit of the general formulae (IIa), (IIb), (IIc) and/or (IId):

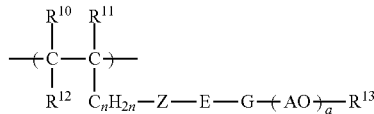

in which
$R^{10}$, $R^{11}$ and $R^{12}$ independently of one another are H or an unbranched or branched $C_1$-$C_4$ alkyl group;
Z is O or S;
E is an unbranched or branched $C_1$-$C_6$ alkylene group, a cyclohexylene group, $CH_2$—$C_6H_{10}$, 1,2-phenylene, 1,3-phenylene or 1,4-phenylene;
G is O, NH or CO—NH; or
E and G together are a chemical bond;
A is $C_xH_{2x}$ with x=2, 3, 4 or 5, or is $CH_2CH(C_6H_5)$, preferably 2 or 3;
n is 0, 1, 2, 3, 4 or 5, preferably 0, 1 or 2;
a is an integer from 2 to 350, preferably 5 to 150;
$R^{13}$ is H, an unbranched or branched $C_1$-$C_4$ alkyl group, CO—$NH_2$ and/or $COCH_3$;

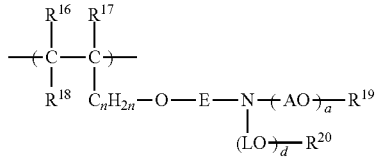

in which
$R^{16}$, $R^{17}$ and $R^{18}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene, or 1,4-phenylene, or is a chemical bond;
A is $C_xH_{2x}$ with x=2, 3, 4 or 5, or is $CH_2CH(C_6H_5)$, preferably 2 or 3;
n is 0, 1, 2, 3, 4 and/or 5, preferably 0, 1 or 2;
L is $C_xH_{2x}$ with x=2, 3, 4 or 5, or is $CH_2$—$CH(C_6H_5)$, preferably 2 or 3;
a is an integer from 2 to 350, preferably 5 to 150;
d is an integer from 1 to 350, preferably 5 to 150;
$R^{19}$ is H or an unbranched or branched $C_1$-$C_4$ alkyl group;
$R^{20}$ is H or an unbranched or branched $C_1$-$C_4$ alkyl group;

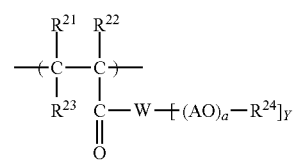

in which
$R^{21}$, $R^{22}$ and $R^{23}$ independently of one another are H or an unbranched or branched $C_1$-$C_4$ alkyl group;
W is O, $NR^{25}$, or is N;
Y is 1 if W=O or $NR^{25}$, and is 2 if W=N;
A is $C_xH_{2x}$ with x=2, 3, 4 or 5, or is $CH_2CH(C_6H_5)$, preferably 2 or 3;
a is an integer from 2 to 350, preferably 5 to 150;
$R^{24}$ is H or an unbranched or branched $C_1$-$C_4$ alkyl group; and
$R^{25}$ is H or an unbranched or branched $C_1$-$C_4$ alkyl group;

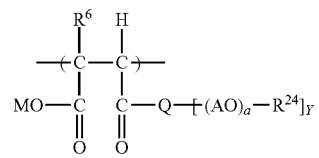

in which
$R^6$ is H or an unbranched or branched $C_1$-$C_4$ alkyl group;
Q is $NR^{10}$, N or O;
Y is 1 if W=O or $NR^{10}$ and is 2 if W=N;
$R^{10}$ is H or an unbranched or branched $C_1$-$C_4$ alkyl group; and
A is $C_xH_{2x}$ with x=2, 3, 4 or 5, or is $CH_2C(C_6H_5)H$, preferably 2 or 3;
$R^{24}$ is H or an unbranched or branched $C_1$-$C_4$ alkyl group;
M is H or a cation equivalent; and
a is an integer from 2 to 350, preferably 5 to 150.

28. Additive according to embodiment 27, where the comb polymer comprises as polyether side chain:
(a) at least one structural unit of the formula (IIa) in which $R^{10}$ and $R^{12}$ are H, $R^{11}$ is H or $CH_3$, E and G together are a chemical bond, A is $C_xH_{2x}$ with x=2 and/or 3, a is 3 to 150, and $R^{13}$ is H or an unbranched or branched $C_1$-$C_4$ alkyl group; and/or
(b) at least one structural unit of the formula (IIb) in which $R^{16}$ and $R^{18}$ are H, $R^{17}$ is H or $CH_3$, E is an unbranched or branched $C_1$-$C_6$ alkylene group, A is $C_xH_{2x}$ with x=2 and/or 3, L is $C_xH_{2x}$ with x=2 and/or 3, a is an integer from 2 to 150, d is an integer from 1 to 150, $R^{19}$ is H or an unbranched or branched $C_1$-$C_4$ alkyl group, and $R^{20}$ is H or an unbranched or branched $C_1$-$C_4$ alkyl group; and/or
(c) at least one structural unit of the formula (IIc) in which $R^{21}$ and $R^{23}$ are H, $R^{22}$ is H or $CH_3$, A is $C_xH_{2x}$ with x=2 and/or 3, a is an integer from 2 to 150, and $R^{24}$ is H or an unbranched or branched $C_1$-$C_4$ alkyl group; and/or
(d) at least one structural unit of the formula (IId) in which $R^6$ is H, Q is O, $R^7$ is $(C_nH_{2n})$—O-$(AO)_a$—$R^9$, n is 2 and/or 3, A is $C_xH_{2x}$ with x=2 and/or 3, a is an integer from 1 to 150 and $R^9$ is H or an unbranched or branched $C_1$-$C_4$ alkyl group.

29. Additive according to one of the embodiments 27 or 28, where the comb polymer comprises at least one structural unit of the formula (IIa) and/or (IIc).

30. Additive according to embodiment 23, where the comb polymer is a polycondensation product which comprises structural units (III) and (IV):

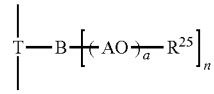

in which
T is a substituted or unsubstituted phenyl radical, substituted or unsubstituted naphthyl radical or a substituted or unsubstituted heteroaromatic radical having 5 to 10 ring atoms, of which 1 or 2 atoms are heteroatoms selected from N, O and S;
n is 1 or 2;
B is N, NH or O, with the proviso that n is 2 if B is N and with the proviso that n is 1 if B is NH or O;
A is $C_xH_{2x}$ with x=2, 3, 4 or 5, or is $CH_2CH(C_6H_5)$;
a is an integer from 1 to 300, preferably 5 to 150;
$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O and S;
where the structural unit (IV) is selected from the structural units (IVa) and (IVb)

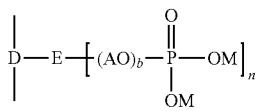
(IVa)

in which
D is a substituted or unsubstituted phenyl radical, substituted or unsubstituted naphthyl radical or a substituted or unsubstituted heteroaromatic radical having 5 to 10 ring atoms, of which 1 or 2 atoms are heteroatoms selected from N, O and S;
E is N, NH or O, with the proviso that m is 2 if E is N and with the proviso that m is 1 if E is NH or O;
A is $C_xH_{2x}$ with x=2, 3, 4 or 5, or is $CH_2CH(C_6H_5)$;
b is an integer from 1 to 300, preferably 1 to 50;
M independently at each occurrence is H, a cation equivalent; and

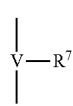
(IVb)

in which
V is a substituted or unsubstituted phenyl radical or substituted or unsubstituted naphthyl radical and is optionally substituted by 1 or two radicals selected independently of one another from $R^8$, OH, $OR^8$, $(CO)R^8$, COOM, $COOR^8$, $SO_3R^8$ and $NO_2$, preferably OH, $OC_1-C_4$ alkyl and $C_1-C_4$ alkyl;
$R^7$ is COOM, $OCH_2COOM$, $SO_3M$ or $OPO_3M_2$;
M is H or a cation equivalent;
where the stated phenyl, naphthyl or heteroaromatic radicals are optionally substituted by 1 or two radicals selected from $R^8$, OH, $OR^8$, $(CO)R^8$, COOM, $COOR^8$, $SO_3R^8$ and $NO_2$; and
$R^8$ is $C_1-C_4$ alkyl, phenyl, naphthyl, phenyl-$C_1-C_4$ alkyl or $C_1-C_4$ alkylphenyl.

31. Additive according to embodiment 30, where, in formula III, T is a substituted or unsubstituted phenyl radical or naphthyl radical, A is $C_xH_{2x}$ with x=2 and/or 3, a is an integer from 1 to 150, and $R^{25}$ is H, or a branched or unbranched $C_1$ to $C_{10}$ alkyl radical.

32. Additive according to embodiment 30, where, in formula IVa, D is a substituted or unsubstituted phenyl radical or naphthyl radical, E is NH or O, A is $C_xH_{2x}$ with x=2 and/or 3, and b is an integer from 1 to 150.

33. Additive according to any of embodiments 29 to 31, where T and/or D are phenyl or naphthyl which is substituted by 1 or 2 $C_1-C_4$ alkyl, hydroxyl or 2 $C_1-C_4$ alkoxy groups.

34. Additive according to embodiment 30, where V is phenyl or naphthyl which is substituted by 1 or 2 $C_1-C_4$ alkyl, OH, $OCH_3$ or COOM, and $R^7$ is COOM or $OCH_2COOM$.

35. Additive according to any of embodiments 30 to 33, where the polycondensation product comprises a further structural unit (V) of the formula

(V)

in which
$R^5$ and $R^6$ may be identical or different and are H, $CH_3$, COOH or a substituted or unsubstituted phenyl or naphthyl group or are a substituted or unsubstituted heteroaromatic group having 5 to 10 ring atoms, of which 1 or 2 atoms are heteroatoms selected from N, O and S.

36. Additive according to embodiment 35, in which $R^5$ and $R^6$ may be identical or different and are H, $CH_3$, or COOH, more particularly H, or one of the radicals $R^5$ and $R^6$ is H and the other is $CH_3$.

37. Additive according to any of embodiments 24 to 29, where the comb polymer comprises units of the formulae (I) and (II), more particularly of the formulae (Ia) and (IIa).

38. Additive according to any of embodiments 24 to 29, where the comb polymer comprises structural units of the formulae (Ia) and (IIc).

39. Additive according to any of embodiments 24 to 29, where the comb polymer comprises structural units of the formulae (Ic) and (IIa).

40. Additive according to any of embodiments 24 to 29, where the comb polymer comprises structural units of the formulae (Ia), (Ic) and (IIa).

41. Additive according to any of embodiments 24 to 29, where the comb polymer is constructed from (i) anionic or anionogenic structural units derived from acrylic acid, methacrylic acid, maleic acid, hydroxyethyl acrylate phosphoric acid ester, and/or hydroxyethyl methacrylate phosphoric acid ester, hydroxyethyl acrylate phosphoric acid diester, and/or hydroxyethyl methacrylate phosphoric acid diester, and (ii) polyether side chain structural units derived from $C_1-C_4$ alkyl-polyethylene glycol acrylic acid ester, polyethylene glycol acrylic acid ester, $C_1-C_4$ alkyl-polyethylene glycol methacrylic acid ester, polyethylene glycol methacrylic acid ester, $C_1-C_4$ alkyl-polyethylene glycol acrylic acid ester, polyethylene glycol acrylic acid ester, vinyloxy-$C_2-C_4$ alkylene-polyethylene glycol, vinyloxy-$C_2-C_4$ alkylene-polyethylene glycol $C_1-C_4$ alkyl ether, allyloxypolyethylene glycol, allyloxypolyethylene glycol $C_1-C_4$ alkyl ether, methallyloxy-polyethylene glycol, methallyloxy-polyethylene glycol $C_1-C_4$ alkyl ether, isoprenyloxy-polyethylene glycol and/or isoprenyloxy-polyethylene glycol $C_1-C_4$ alkyl ether.

42. Additive according to embodiment 41, where the comb polymer is constructed from structural units (i) and (ii) derived from (i) hydroxyethyl acrylate phosphoric acid ester and/or hydroxyethyl methacrylate phosphoric acid ester and (ii) $C_1$-$C_4$ alkyl-polyethylene glycol acrylic acid ester and/or $C_1$-$C_4$ alkyl-polyethylene glycol methacrylic acid ester; or (i) acrylic acid and/or methacrylic acid and (ii) $C_1$-$C_4$ alkyl-polyethylene glycol acrylic acid ester and/or $C_1$-$C_4$ alkyl-polyethylene glycol methacrylic acid ester; or (i) acrylic acid, methacrylic acid and/or maleic acid and (ii) vinyloxy-$C_2$-$C_4$ alkylene-polyethylene glycol, allyloxy-polyethylene glycol, methallyloxy-polyethylene glycol and/or isoprenyloxy-polyethylene glycol.

43. Additive according to embodiment 41, where the comb polymer is constructed from structural units (i) and (ii) derived from (i) hydroxyethyl methacrylate phosphoric acid ester and (ii) $C_1$-$C_4$ alkyl-polyethylene glycol methacrylic acid ester or polyethylene glycol methacrylic acid ester; or (i) methacrylic acid and (ii) $C_1$-$C_4$ alkyl-polyethylene glycol methacrylic acid ester or polyethylene glycol methacrylic acid ester; or (i) acrylic acid and maleic acid and (ii) vinyloxy-$C_2$-$C_4$ alkylene-polyethylene glycol or (i) acrylic acid and maleic acid and (ii) isoprenyloxy-polyethylene glycol or (i) acrylic acid and (ii) vinyloxy-$C_2$-$C_4$ alkylene-polyethylene glycol or (i) acrylic acid and (ii) isoprenyloxy-polyethylene glycol or (i) acrylic acid and (ii) methallyloxy-polyethylene glycol or (i) maleic acid and (ii) isoprenyloxy-polyethylene glycol or (i) maleic acid and (ii) allyloxy-polyethylene glycol or (i) maleic acid and (ii) methallyloxy-polyethylene glycol.

44. Additive according to any of embodiments 24 to 29, where the molar ratio of the structural units (I): (II) is 1:4 to 15:1, more particularly 1:1 to 10:1.

45. Additive according to any of the preceding embodiments, where the molar weight of the polyether side chains is >500 g/mol, preferably >3000 g/mol and <8000 g/mol, preferably <6000 g/mol.

46. Additive according to embodiment 45, where the molar weight of the polyether side chains is in the range from 2000-8000 g/mol, more particularly 4000-6000 g/mol.

47. Additive according to any of embodiments 30 to 36, where the molar ratio of the structural units (III): (IV) is 4:1 to 1:15, more particularly 2:1 to 1:10.

48. Additive according to any of embodiments 30 to 36, where the molar ratio of the structural units (III+IV): (V) is 2:1 to 1:3, more particularly 1:0.8 to 1:2.

49. Additive according to any of the preceding embodiments, where the charge density of the polymeric sulfonated dispersant is in the range from 1 mmol/g-10 mmol/g, preferably 2 mmol/g-5 mmol/g.

50. Additive according to any of the preceding embodiments, where the molar weight of the polymeric sulfonated dispersant is in the range from 1000 g/mol to 80 000 g/mol, preferably 5000 g/mol to 70 000 g/mol.

51. Additive according to any of embodiments 30 to 36 or 47 to 48, where the comb polymer is constructed from structural units of the formulae (III) and (IV), in which T and D are phenyl or naphthyl, the phenyl or naphthyl being optionally substituted by 1 or 2 $C_1$-$C_4$ alkyl, hydroxyl or 2 $C_1$-$C_4$ alkoxy groups, B and E are 0, A is $C_xH_{2x}$ with x=2, a is 3 to 150, more particularly 10 to 150, and b is 1, 2 or 3.

52. Additive according to any of the preceding embodiments, comprising a sulfonated acetone-formaldehyde condensate or cyclohexanone-formaldehyde condensate as polymeric sulfonated dispersant, $Ca^{2+}$ as metal cation and aluminate as anion.

53. Additive according to any of the preceding embodiments, obtainable by precipitating the salt of the metal cation in the presence of the polymeric sulfonated dispersant, to give a colloidally disperse preparation of the salt.

54. Additive according to any of the preceding embodiments, obtainable by dispersing a freshly precipitated salt of the polyvalent metal cation in the presence of the polymeric sulfonated dispersant, to give a colloidally disperse preparation of the salt.

55. Additive according to embodiment 53 or 54, where a neutralizing agent is added to the colloidally disperse preparation.

56. Additive according to any of embodiments 1 to 55, obtainable by peptizing a hydroxide and/or oxide of the polyvalent metal cation with an acid, to give a colloidally disperse preparation of the salt of the polyvalent metal cation.

57. Additive according to embodiment 55, where the acid is selected from boric acid, carbonic acid, oxalic acid, silicic acid, sulfuric acid, polyphosphoric acid, phosphoric acid, phosphorous acid, an $Al^{3+}$ hexaaquo complex and/or an $Fe^{3+}$ hexaaquo complex.

58. Additive according to embodiment 1, where the additive comprises no preparation in which the metal cation is $Ca^{2+}$, the anion is aluminate and the polymeric sulfonated dispersant is a β-naphthalenesulfonate-formaldehyde condensate.

59. Additive according to any of the preceding embodiments, wherein the sulfonated polymeric dispersant is selected from sulfonated ketone-formaldehyde condensates, sulfonated melaminesulfonate-formaldehyde condensates, naphthalenesulfonate-formaldehyde condensates, more particularly β-naphthalenesulfonate-formaldehyde condensates and lignosulfonates, and the anion is selected from ferrate, carbonate, oxalate, silicate, phosphate, polyphosphate, phosphite, borate, sulfate and mixtures thereof, in particular from ferrate, carbonate, silicate, phosphate and mixtures thereof.

60. Additive according to embodiment 59, wherein the sulfonated polymeric dispersant is selected from β-naphthalenesulfonate-formaldehyde condensates and lignosulfonates and mixtures thereof, and the anion is selected from ferrate, carbonate, silicate, phosphate and mixtures thereof.

61. Additive according to any of the preceding embodiments, wherein the dispersant comprises 70 to 100% by weight, preferably 80 to 100% by weight, in particular 90 to 100% by weight, of the total dispersant of a polymeric sulfonated dispersant having anionic and/or anionogenic groups.

62. Additive according to embodiment 61, where the dispersant comprises 70 to 90% by weight, preferably 80 to 90% by weight, of polymeric sulfonated dispersant and 10 to 30% by weight, preferably 10 to 20% by weight, of the polymeric dispersant comprising anionic and/or anionogenic groups and polyether side chains.

63. Additive according to any of the preceding embodiments, wherein the molar ratio of anion to cation is in the range from 0.05 to 0.5, preferably 0.1 to 0.4.

64. Building material mixture comprising an additive according to any of embodiments 1 to 63 and a binder selected from (Portland) cement, slag sand, fly ash, silica dust, metakaolin, natural pozzolans, burnt oil shale, calcium aluminate cement and binders based on calcium sulfate such as α-hemihydrate, α/β-hemihydrate, β-hemihydrate, natural anhydrite, synthetic anhydrite, anhydrite obtained from flue-gas desulfurization, and mixtures thereof.

65. Building material mixture according to embodiment 64, which comprises (Portland) cement or a calcium sulfate-based binder as hydraulic binder.

66. Building material mixture according to embodiment 65, which comprises substantially no (0% to 5% by weight) Portland cement.

M in the stated formulae of the above embodiments is preferably in each case an alkali metal ion, more particularly the sodium ion, ½ alkaline earth metal ion (i.e. one equivalent), more particularly ½ calcium ion, the ammonium ion, or an organic ammonium ion, such as a $C_1$-$C_4$ alkylamine or a monohydroxy-$C_1$-$C_4$ alkylamine.

According to one embodiment, the metal cation is present in an amount corresponding to the following formula (a):

$$1 < \frac{\sum_i z_{K,i} * n_{K,i}}{\sum_j z_{S,j} * n_{S,j}} < 30$$

where $z_{K,i}$ stands for the amount of the charge number of the metal cation, $n_{K,i}$ stands for the number of moles of the metal cation weighed out, $z_{S,j}$ stands for the amount of the charge number of the anionic and anionogenic groups present in the polymeric dispersant, $n_{S,j}$ stands for the number of moles of anionic and anionogenic groups present in the polymeric dispersant weighed out, the indices i and j are independent of one another and are an integer greater than 0, i stands for the number of different kinds of metal cations and j stands for the number of sulfonic acid and/or sulfonate groups present in the polymeric dispersant, with z being defined such that the charge number for cations always relates to the full formal charge, i.e. $z_{Fe}$(FeCl$_3$)=3, $z_{Fe}$(FeCl$_2$)=2. Furthermore, z stands for the amount of the formal charge of the anions on maximum deprotonation, i.e. $z_{PO4}$(H$_3$PO$_4$)=$z_{PO4}$(Na$_3$PO$_4$)=3, or $z_{CO3}$(Na$_2$CO$_3$)=2. In the case of aluminate, it is specified that $z_{AlO2}$(NaAlO$_2$)=$z_{AlO2}$(NaAl(OH)$_4$)=1; in the case of silicate, $z_{SiO3}$(Na$_2$SiO$_3$)=2 is set for all silicate species.

The sum of the number of moles $n_{S,j}$ in mmol/g in the polymeric sulfonated dispersant and optionally in the comb polymer can be determined by various known methods, as for example by determination by charge density titration with a polycation as described for example in J. Plank et al., Cem. Concr. Res. 2009, 39, 1-5. Moreover, the skilled person familiar with the state of the art is capable of determining this value in a simple calculation from the initial weighings of monomers for the synthesis of the polymeric sulfonated dispersant and/or of the comb polymer.

The metal cation is selected from $Ca^{2+}$, $Al^{3+}$, $Fe^{3+}$, $Fe^{2+}$, $Zn^{2+}$, $Mn^{2+}$, $Cu^{2+}$, $Mg^{2+}$, $Sr^{2+}$, $Ba^{2+}$, $Li^+$ and mixtures thereof, preferably selected from $Ca^{2+}$, $Al^{3+}$, $Mg^{2+}$, $Fe^{3+}$, $Fe^{2+}$, $Mn^{2+}$, $Zn^{2+}$ and mixtures thereof, more preferably selected from $Ca^{2+}$, $Al^{3+}$, $Mg^{2+}$, $Fe^{3+}$, $Fe^{2+}$ and mixtures thereof and is in particular $Ca^{2+}$.

The counteranion of the metal cation salt used is preferably selected such that the salts are readily water-soluble, the solubility under standard conditions of 20° C. and atmospheric pressure being preferably greater than 10 g/l, more preferably greater than 100 g/l and very particularly greater than 200 g/l. The numerical value of the solubility here relates to the solution equilibrium (MX=$M^{n+}$+$X^{n-}$, where $M^{n+}$: metal cation; $X^{n-}$: anion) of the pure substance of the salt in deionised water at 20° C. under atmospheric pressure, and takes no account of the effects of protonation equilibriums (pH) and complexation equilibriums.

The anions are preferably sulfate, or a singly charged counteranion, preferably a nitrate, acetate, formate, hydrogensulfate, halide, halate, pseudohalide, methanesulfonate and/or amidosulfonate. Particularly preferred from the series of halogens is chloride. The pseudohalides include cyanide, azide, cyanate, thiocyanate and fulminate. Double salts as well can be used as metal salt. Double salts are salts which have two or more different cations. An example is alum (KAl(SO$_4$)$_2$.12H$_2$O) which is suitable as an aluminium salt. The metal cation salts with the aforementioned counteranions are readily water-soluble and hence especially suitable, since relatively high concentrations of the aqueous metal salt solutions (as reactant) can be established.

The amount of the charge number of the anionic and anionogenic groups, for instance sulfonic acid and/or sulfonate groups and optionally carboxyl or carboxylate groups, present in the polymeric sulfonated dispersant is the charge number which is present on complete deprotonation of the anionogenic group (SO$_3$H or COOH group).

Anionic groups are the deprotonated acid groups present in the polymeric dispersant. Anionogenic groups are the acid groups present in the polymeric dispersant. Groups which are both anionic and anionogenic, such as partially deprotonated polybasic acid residues, are assigned exclusively to the anionic groups when forming the sum of the molar amounts of the anionic and anionogenic groups present in the polymeric dispersant.

Anionic and anionogenic groups of the polymeric dispersant are said to be of different kinds when they cannot be converted into one another by protonation.

The term "different kinds of polyvalent metal cations" refers to polyvalent metal cations of different elements. Furthermore, the term "different kinds of polyvalent metal cations" also refers to metal cations of the same element with different charge numbers.

The ratio according to formula (a) is preferably in the range from 0.5 to 30 or 1 to 10. More preferably, the ratio is in the range from 1 to 8 or 1.1 to 8 or 1 to 6 or 1.1 to 6 or 1.2 to 6, and more particularly in the range from 1 to 5 or 1.1 to 5 or 1.2 to 5 or 1.25 to 5.

The additive for hydraulically setting compositions comprises at least one anion which is capable of forming a low-solubility salt with the polyvalent metal cation, a low-solubility salt being a salt whose solubility in water at pH 9 and under standard conditions of 20° C. and atmospheric pressure is preferably less than 5 g/l, more preferably less than 1 g/l.

According to one embodiment, the anion is selected from aluminate, ferrate, carbonate, oxalate, silicate, phosphate, polyphosphate, phosphite, borate and sulfate. The anion is preferably selected from aluminate, ferrate, carbonate, silicate and phosphate, and more preferably the anion is aluminate. The anion source may be a water-soluble acid or a water-soluble salt, with water-soluble acid or water-soluble salt referring to a solubility in water under standard conditions of 20° C. in atmospheric pressure of preferably more than 20 g/l, more preferably more than 100 g/l. The numerical value of this solubility pertains to the solution equilibrium ($KAn=K^{n+}+An^{n-}$, where $K^{n+}$: cation; $An^{n-}$: anion) of the pure substance of the anion compound in deionized water at 20° C. under atmospheric pressure, without any account taken of the effects of protonation equilibria (pH) and complexation equilibria.

According to a further embodiment, the anion is present in an amount corresponding to the following formula (b):

$$0.01 \leq \frac{\sum_l z_{A,l} \cdot n_{A,l}}{\sum_i z_{K,i} \cdot n_{K,i}} < 3$$

where $z_{K,i}$ stands for the amount of the charge number of the polyvalent metal cations, $n_{K,i}$ stands for the number of moles of the polyvalent metal cation weighed out, $z_{A,l}$ stands for the charge number of the anion weighed out, and $n_{A,l}$ stands for the number of moles of the anion weighed out.

The ratio according to formula (b) is preferably in the 0.01 to 2 range, more preferably 0.1 to 1.5. In this context, any range for formula (a) that is specified within the bounds of the present description and of the claims can be combined with any range for formula (b).

The stated anions also include the polymeric borate, silicate and oxalate anions, and also the polyphosphates. The term "polymeric anions" refers to anions which as well as oxygen atoms comprise at least two atoms from the group consisting of boron, carbon, silicon and phosphorus. With particular preference they are oligomers having a number of atoms of between 2 and 20, more particularly preferably 2 to 14 atoms, most preferably 2 to 5 atoms. The number of atoms in the case of the silicates is more preferably in the range from 2 to 14 silicon atoms, and in the case of the polyphosphates it is more preferably in the range from 2 to 5 phosphorus atoms.

Preferred silicates is $Na_2SiO_3$ and waterglass, with a modulus, defined as the ratio of $SiO_2$ to alkali metal oxide, in the range from 1/1 to 4/1, more preferably 1/1 to 3/1.

With the silicates it is possible for some of the silicon atoms in the silicates to be replaced by aluminium. Such compounds are known from the class of the aluminosilicates. The fraction of aluminium is preferably less than 10 mol %, based on the sum of silicon and aluminium, and more preferably the aluminium fraction is zero.

It has proved to be advantageous if the anion is phosphate and the ratio according to formula (b) is in the range from 0.1 to 1.

It has further proved to be advantageous if the anion is aluminate or carbonate and the ratio according to formula (b) is in the range from 0.01 to 2.

It has further proved to be advantageous if the anion is silicate and the ratio according to formula (b) is in the range from 0.01 to 2.

The counter-cation of the anion salt which is able to form a low-solubility salt with the polyvalent metal cation is preferably a singly charged cation or a proton, preferably an alkali metal cation and/or ammonium ion. The ammonium ion may also comprise an organic ammonium ion, examples being alkylammonium ions having one to four alkyl radicals. The organic radical may also be of aromatic type or comprise aromatic radicals. The ammonium ion may also be an alkanolammonium ion.

The sulfonated melaminesulfonate-formaldehyde condensates used as polymeric sulfonated dispersants are of the kind frequently used as plasticizers for hydraulic binders (also referred to as MFS resins). Sulfonated melaminesulfonate-formaldehyde condensates and their preparation are described in, for example, CA 2 172 004 A1, DE 44 11 797 A1, U.S. Pat. No. 4,430,469, 6,555,683 and CH 686 186 and also in Ullmann's Encyclopedia of Industrial Chemistry, 5$^{th}$ Ed., vol. A2, page 131, and Concrete Admixtures Handbook—Properties, Science and Technology, 2$^{nd}$ Ed., pages 411, 412. Preferred sulfonated melaminesulfonate-formaldehyde condensates encompass (greatly simplified and idealized) units of the formula

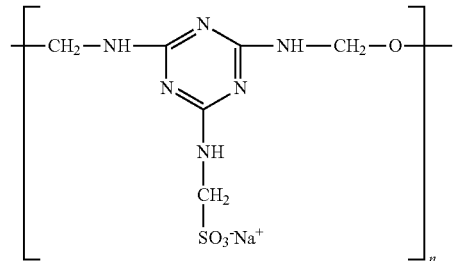

Melamine formaldehyde
sulfonate (PMS)

in which n stands generally for 10 to 300. The molar weight is situated preferably in the range from 2500 to 80 000. An example of melaminesulfonate-formaldehyde condensates are the products sold by BASF Construction Solutions GmbH under the Melment® name.

Additionally to the sulfonated melamine units it is possible for other monomers to be incorporated by condensation. Particularly suitable is urea. Moreover, further aromatic units as well may be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid, for example.

The lignosulfonates used as polymeric sulfonated dispersants are products which are obtained as by-products in the paper industry. They are described in Ullmann's Encyclopedia of Industrial Chemistry, 5$^{th}$ Ed., vol. A8, pages 586, 587. They include units of the highly simplified and idealizing formula

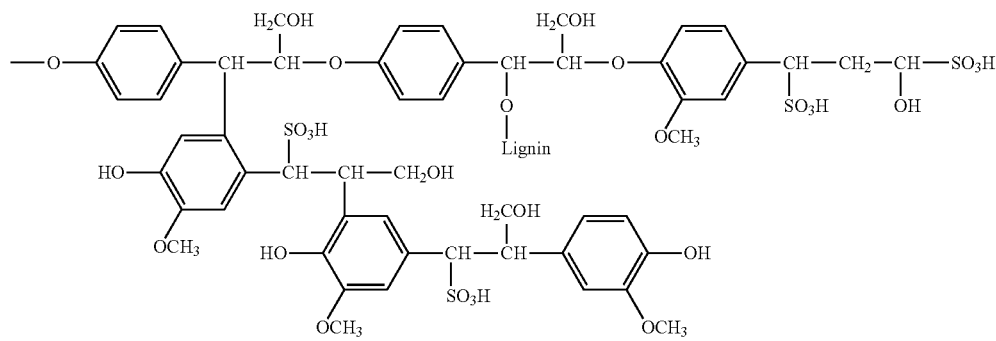

where n stands generally for 5 to 500. Lignosulfonates have molar weights of between 2000 and 100 000 g/mol. In general they are present in the form of their sodium, calcium and/or magnesium salts. Examples of suitable lignosulfonates are the products from the Norwegian company Borregaard LignoTech that are sold under the Borresperse commercial designation.

The sulfonated ketone-formaldehyde condensates used as polymeric sulfonated dispersants are products incorporating a monoketone or diketone as ketone component, preferably acetone, butanone, pentanone, hexanone or cyclohexanone. Condensates of this kind are known and are described in WO 2009/103579, for example. Sulfonated acetone-formaldehyde condensates are preferred. They generally comprise units of the formula (according to J. Plank et al., J. Appl. Poly. Sci. 2009, 2018-2024:

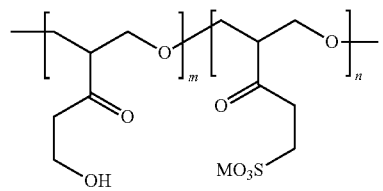

where m and n are generally each 10 to 250, M is an alkali metal ion, such as Na⁺, and the ratio m:n is in general in the range from about 3:1 to about 1:3, more particularly about 1.2:1 to 1:1.2. Examples of suitable acetone-formaldehyde condensates are the products sold by BASF Construction Solutions GmbH under the Melcret K1L commercial designation.

Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid, for example.

The sulfonated naphthalene-formaldehyde condensates used as polymeric sulfonated dispersants are products obtained by sulfonation of naphthalene and subsequent polycondensation with formaldehyde. They are described in references including Concrete Admixtures Handbook—Properties, Science and Technology, 2$^{nd}$ Ed., pages 411-413 and in Ullmann's Encyclopedia of Industrial Chemistry, 5$^{th}$ Ed., vol. A8, pages 587, 588. They comprise units of the formula

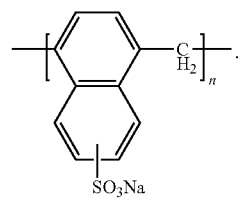

Typically, molar weights (Mw) of between 1000 and 50 000 g/mol are obtained. Examples of suitable β-naphthalene-formaldehyde condensates are the BASF Construction Solutions GmbH products sold under the Melcret 500 L commercial designation.

Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid, for example.

The copolymers obtainable by radical copolymerization are constructed of sulfonic acid monomers and copolymerizable comonomers. Suitable sulfonated monomers are as follows: allylsulfonic acid, methallylsulfonic acid, 2-acrylamido-2-methylpropanesulfonic acid, styrenesulfonic acid, vinylsulfonic acid, sulfoethyl methacrylate, 3-sulfopropyl acrylate and the metal salts thereof.

Suitable comonomers are:
arylalkenes and heteroarylalkenes, optionally substituted, such as: styrene, alpha-methylstyrene, vinylpyridine, 4-vinylbenzoic acid, 4-vinylphthalic acid, and salts thereof
allyl and methallyl compounds such as the following, for example: allyl alcohol, methallyl alcohol, 3-allyloxy-1,2-propanediol, 3-allyloxy-1,2-propanediol, 3-allyloxy-1,2-propanediol (polyalkoxyl) ether, 3-methallyloxy-1,2-propanediol, 3-methallyloxy-1,2-propanediol (polyalkoxyl) ether, isoprenol, isoprenol alkyl ethers,
vinyl ethers such as, for example, 1-butyl vinyl ether, isobutyl vinyl ether, aminopropyl vinyl ether, ethylene glycol monovinyl ether, 4-hydroxybutyl monovinyl ether, vinyl ether alkoxylates,
vinyl esters such as, for example, vinyl acetate, vinyl carbamate,
vinylic aldehydes and ketones such as, for example, acrolein, methacrolein, vinyl-1,3-dioxolane, crotonaldehyde, 3-oxo-1-butene,
acrylic acid and methacrylic acid, their salts and their esters such as, for example, 2-hydroxyethyl acrylate, 2-hydroxyethyl methacrylate, 2-hydroxypropyl acrylate, 2-hydroxypropyl methacrylate, methyl methacrylate, ethyl methacrylate, methyl acrylate, (methyl)-polyoxyalkyl acrylates, (methyl)-polyoxyalkyl methacrylates, 2,3-hydroxypropyl (meth)acrylate, acrylamides and methacrylamides, optionally substituted, such as acrylamide, methacrylamide, N,N-dimethylacrylamide, N-isopropylacrylamide, N-methacryloylglycinamide, acryloyloxyethyltrimethylammonium chloride, acrylonitrile and methacrylonitrile, unsaturated polycarboxylic acids and their derivatives such as, for example: maleic acid, maleic anhydride, maleic monoesters and diesters such as, for example: dimethyl maleate, monomethyl maleate, diethyl maleate, ethyl maleate, dibutyl maleate, poly(oxyalkylene monomethyl ether) monomaleate, poly(oxyalkylene monomethyl ether) dimaleate, (phosphonooxyalkylene) monomaleate, (phosphonooxyalkylene) dimaleate, maleamides such as, for example, maleic acid sulfanilamide, poly(oxyalkylene monomethyl ether)maleamide, poly(oxyalkylene)maleamide, (phosphonooxyalkylene)maleic monoamide, (phosphonooxyalkylene) maleic diamide, maleic monoanilide, maleimides such as, for example, maleimide, N-ethylmaleimide, itaconic acid and itaconic anhydride, itaconic mono(di)esters such as, for example: dimethyl itaconate, monomethyl itaconate, diethyl itaconate, monoethyl itaconate, mono-poly (oxyalkylene monomethyl ether) itaconate, di-poly (oxyalkylene monomethyl ether) itaconate, itaconamide such as, for example: monomethylpolyoxyalkyleneitaconamide, 2,4-hexanedienoic acid, vinylic sulfur compounds such as styrenesulfonic acid, 2-acrylamido-2-methylpropanesulfonic acid, (meth)allylsulfonic acid, vinylsulfonic acid, —N-vinyl amides such as, for example: 1-vinyl-2-pyrrolidone, 1-vinyl-2-piperidine, 1-vinyl-2-caprolactam, 5-vinylcarbazole, 2-methyl-5-vinylpyridine, N-vinylacetamide, N-vinylformamide, alkenes and their derivatives: 2-butene-1,4-diol (and also its polyoxyalkylates), 3,4-dihydroxy-1-butene (and also its polyoxyalkylates), dimethylvinylcarbinol (and also its polyoxyalkylates), prenol (and also its polyoxyalkylates), 3-methyl-3-buten-2-ole (and also its polyoxyalkylates).

Preferred comonomers are as follows: hydroxyethyl (meth)acrylate, hydroxypropyl (meth)acrylate, (meth)acrylamide, ($C_1$-$C_4$)-alkyl (meth)acrylates, styrene, vinyl acetate, acrolein, N-vinylformamide, vinylpyrrolidone, (meth)allyl alcohol, isoprenol, 1-butyl vinyl ether, isobutyl vinyl ether, aminopropyl vinyl ether, ethylene glycol monovinyl ether, 4-hydroxybutyl monovinyl ether, (meth)acrolein, crotonaldehyde, dibutyl maleate, dimethyl maleate, diethyl maleat, dipropyl maleate, acrylic acid, maleic acid, maleic anhydride, methacrylic acid.

The molar weights of the copolymers obtainable by radical copolymerization are in general in the range from 2500 to 100 000 g/mol.

The copolymers obtainable by radical copolymerization are prepared conventionally, as for example as described in Principles of Polymerization, George Odian, John Wiley & Sons, 2004, and Hans-Georg Elias, Makromoleküle, 6$^{th}$ edition, volume 1, 1999.

According to one embodiment, the additives of the invention do not include any preparation for which the metal cation is $Ca^{2+}$, the anion is aluminate and the polymeric sulfonated dispersant is a β-naphthalenesulfonate-formaldehyde condensate.

According to a further embodiment, the polymeric sulfonated dispersants comprise no polyethylene side chains.

According to a further embodiment, the comb polymers comprise no units with sulfonic acid groups or sulfonate groups.

The additive for hydraulically setting compositions may further comprise at least one neutralizing agent.

The neutralizing agent is preferably an organic amine, a polyamine or ammonia, since these neutralizing agents more effectively prevent the coagulation of precipitating salt. Suitable organic amines are more particularly an aliphatic monoamine or aliphatic polyamine. Polyamines include diamines and triamines.

The neutralizing agent is preferably selected from ammonia, monohydroxy-$C_1$-$C_4$ alkylamines, dihydroxy-$C_1$-$C_4$ alkylamines, trihydroxy-$C_1$-$C_4$ alkylamines, mono-$C_1$-$C_4$ alkylamines, di-$C_1$-$C_4$ alkylamines, tri-$C_1$-$C_4$ alkylamines, $C_1$-$C_4$ alkylenediamines, (tetrahydroxy-$C_1$-$C_4$ alkyl)-$C_1$-$C_4$ alkylenediamines, polyethylenimines, polypropylenimines and mixtures thereof.

More preferably the neutralizing agent is selected from ammonia, monohydroxy-$C_1$-$C_4$ alkylamines, dihydroxy-$C_1$-$C_4$ alkylamines, trihydroxy-$C_1$-$C_4$ alkylamines, $C_1$-$C_4$ alkylenediamines, and polyethylenimines.

More particularly preferred neutralizing agents are selected from ammonia, ethylenediamine, monoethanolamine, diethanolamine, triethanolamine and polyethylenimines.

The additive for hydraulically setting compositions preferably has a pH of 2 to 13, preferably 6 to 12, more particularly 9-11.5.

The additives may additionally comprise at least one polymeric dispersant (comb polymer) comprising anionic and/or anionogenic groups and polyether side chains.

The anionic and anionogenic groups are preferably carboxyl, carboxylate or phosphate groups, hydrogenphosphate or dihydrogenphosphate groups.

In one embodiment the comb polymer comprises at least one structural unit of the general formulae (Ia), (Ib), (Ic) and/or (Id) defined above, it being possible for the structural units (Ia), (Ib), (Ic) and (Id) to be the same or different both within individual polymer molecules and between different polymer molecules.

With particular preference, the structural unit of formula Ia is a methacrylic acid or acrylic acid unit, the structural unit of formula Ic is a maleic anhydride unit, and the structural unit of formula Id is a maleic acid or maleic monoester unit.

Where the monomers (I) are phosphoric esters or phosphonic esters, they may also include the corresponding diesters and triesters and also the monoester of diphosphoric acid. These esters come about in general during the esterification of organic alcohols with phosphoric acid, polyphosphoric acid, phosphorus oxides, phosphorus halides or phosphorus oxyhalides, and/or the corresponding phosphonic acid compounds, alongside the monoester, in different proportions, as for example 5-30 mol % of diester and 1-15 mol % of triester and also 2-20 mol % of the monoester of diphosphoric acid.

In one embodiment the comb polymer comprises at least one structural unit of the general formulae (IIa), (IIb), (IIc) and/or (IId) defined above. The general formulae (IIa), (IIb), (IIc) and (IId) may be identical or different not only within individual polymer molecules but also between different polymer molecules. All structural units A in the formulae mentioned may be identical or different both within individual polyether side chains and between different polyether side chains.

With particular preference the structural unit of formula IIa is an alkoxylated isoprenyl unit, alkoxylated hydroxybutyl vinyl ether unit, alkoxylated (meth)allyl alcohol unit or a vinylated methylpolyalkylene glycol unit, in each case preferably with an arithmetic average of 2 to 350 oxyalkylene groups.

According to one embodiment, the comb polymer comprises the structural units of the formulae (I) and (II). Besides the structural units of the formulae (I) and (II), the polymeric dispersant may also comprise further structural units, which derive from radically polymerisable monomers, such as hydroxyethyl (meth)acrylate, hydroxypropyl (meth)acrylate, (meth)acrylamide, ($C_1$-$C_4$) alkyl (meth)acrylates, styrene, styrenesulfonic acid, 2-acrylamido-2-methylpropanesulfonic acid, (meth)allylsulfonic acid, vinylsulfonic acid, vinyl acetate, acrolein, N-vinylformamide, vinylpyrrolidone, (meth)allyl alcohol, isoprenol, 1-butyl vinyl ether, isobutyl vinyl ether, aminopropyl vinyl ether, ethylene glycol monovinyl ether, 4-hydroxybutyl monovinyl ether, (meth)acrolein, crotonaldehyde, dibutyl maleate, dimethyl maleate, diethyl maleate, dipropyl maleate, etc.

The average molecular weight $M_w$ of the salt of polyvalent metal cation and polymeric sulfonated dispersant and/or of the comb polymer, as determined by gel permeation chromatography (GPC), is generally in the range from about 2500 to about 1 000 000 g/mol.

The average molecular weight $M_w$ of the polymeric sulfonated dispersant and/or of the comb polymer, as determined by gel permeation chromatography (GPC) is preferably 1000 to 80 000 g/mol, and very preferably 5000 to 70 000 g/mol. The molecular weight was determined as described in more detail below.

The polymeric sulfonated dispersant and/or the comb polymer preferably meet the requirements of the industrial standard EN 934-2 (February 2002).

The comb polymers comprising the structural units (I) and (II) are prepared in a conventional way, by means of radical polymerisation, for example. This is described for example in EP0894811, EP1851256, EP2463314, EP0753488.

In one embodiment the comb polymer is a polycondensation product which comprises the structural units (III) and (IV) defined above:

The structural units T and D in the general formulae (III) and (IV) in the polycondensation product are preferably derived from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, phenoxyacetic acid, salicylic acid, preferably from phenyl, where T and D may be selected independently of one another and may also each be derived from a mixture of the stated radicals. The groups B and E independently of one another are preferably O. All structural units A may be identical or different not only within individual polyether side chains but also between different polyether side chains. In one particularly preferred embodiment, A is $C_2H_4$.

In the general formula (III), a is preferably an integer from 1 to 300 and more particularly 5 to 150, and in the general formula (IV) b is preferably an integer from 1 to 300, more particularly 1 to 50 and more preferably 1 to 10. Furthermore, the radicals of the general formulae (III) or (IV) may independently of one another in each case possess the same chain length, in which case a and b are each represented by a number. In general it will be useful for mixtures with different chain lengths to be present, so that the radicals of the structural units in the polycondensation product have different numerical values for a and, independently, for b.

The polycondensation product generally has a weight-average molecular weight of 5000 g/mol to 200 000 g/mol, preferably 10 000 to 100 000 g/mol and more preferably 15 000 to 55 000 g/mol.

The molar ratio of the structural units (III):(IV) is typically 4:1 to 1:15 and preferably 2:1 to 1:10. It is advantageous to have a relatively high fraction of structural units (IV) in the polycondensation product, since a relatively high negative charge of the polymers has a good influence on the stability of the aqueous colloidally disperse preparation. The molar ratio of the structural units (IVa):(IVb), when both are present, is typically 1:10 to 10:1 and preferably 1:3 to 3:1.

In a preferred embodiment the polycondensation product comprises a further structural unit (V), which is represented by the formula below:

in which
$R^5$ is H, $CH_3$, COOH or substituted or unsubstituted phenyl or substituted or unsubstituted naphthyl;
$R^6$ is H, $CH_3$, COOH or substituted or unsubstituted phenyl or substituted or unsubstituted naphthyl.

Preferably $R_5$ and $R_6$ are H or one of the radicals $R_5$ and $R_6$ is H and the other is $CH_3$.

$R^5$ and $R^6$ in structural unit (V) are typically identical or different and are H, COOH and/or methyl. Very particular preference is given to H.

In another embodiment the molar ratio of the structural units [(111)+(IV)]: (V) in the polycondensate is 2:1 to 1:3, preferably 1:0.8 to 1.2.

The polycondensates are typically prepared by a process which comprises reacting with one another the compounds forming the basis for the structural units (Ill), (IV) and (V). The preparation of the polycondensate is for example described in WO 2006/042709 and WO 2010/026155.

The monomer with a keto group is preferably an aldehyde or ketone. Examples of monomers of the formula (V) are formaldehyde, acetaldehyde, acetone, glyoxylic acid and/or benzaldehyde. Formaldehyde is preferred.

The comb polymer may also be present in the form of its salts, such as, for example, the sodium, potassium, organic ammonium, ammonium and/or calcium salt, preferably as the sodium and/or calcium salt.

The additives preferably comprise 50% to 95% water and 5% to 50% solid, more preferably 45%-85% water and 15% to 45% solid. The solid here comprises the sulfonated polymer and also the metal cation salt the anion salt whose anion forms a low-solubility salt with the polyvalent metal cation.

The additive of the invention may take the form of an aqueous product in the form of a solution, emulsion or dispersion or in solid form, for example as a powder, after a drying step. The water content of the additive in solid form is in that case preferably less than 10% by weight, more preferably less than 5% by weight. It is also possible for some of the water, preferably up to 10% by weight, to be replaced by organic solvents. Advantageous are alcohols such as ethanol, (iso)propanol and 1-butanol, including its isomers. Acetone can be used as well. By the use of the organic solvents it is possible to influence the solubility and hence the crystallization behaviour of the salts of the invention.

The additives of the invention are produced by contacting the salt of the metal cation, the anion and the polymeric dispersant in an aqueous medium, in solid form or in a polymer melt. Preference is given to using a water-soluble salt of the polyvalent metal cation. The salt of the metal cation may be provided in solid form, or else, expediently, as an aqueous solution or suspension. It is therefore possible to add the metal cation salt in the form of a powder, an aqueous solution or else an aqueous suspension to an aqueous solution of a dispersant.

The water-soluble anion salt may likewise be used both in solid form (preparation in situ of a solution, or contact with the polymer melt) or else preferably in the form of an aqueous solution.

An additive of the invention for hydraulically setting compositions may be obtained by precipitating the salt of the metal cation in the presence of the polymeric sulfonated dispersant, to give a colloidally disperse preparation of the salt. The precipitation of the salt of the metal cation here means the formation of colloidally disperse salt particles which are dispersed by the polymeric sulfonated dispersant and their further calculation is prevented.

Irrespective of whether the salt of the metal cation is precipitated in the presence of the polymeric sulfonated dispersant or whether a freshly precipitated salt of the metal cation is dispersed in the presence of the polymeric sulfonated dispersant, the additive of the invention for hydraulically setting compositions may also be obtained, alternatively, by additionally admixing the preparation with a neutralizing agent as described above.

An additive of the invention for hydraulically setting compositions may also be obtained by treating a hydroxide and/or oxide of the polyvalent metal cation with an acid, to give a colloidally disperse preparation of the salt of the polyvalent metal cation, in which case the acid is selected preferably from boric acid, carbonic acid, oxalic acid, silicic acid, polyphosphoric acid, phosphoric acid, phosphorous acid, an $Al^{3+}$ hexaaquo complex and/or an $Fe^{3+}$ hexaaquo complex.

The additive is prepared generally by mixing the components, which are preferably in the form of an aqueous solution. In this case it is preferred first to mix the polymeric sulfonated dispersant and the metal cation and then to add the anion which is capable of forming a low-solubility salt with the metal cation. According to another embodiment, the polymeric sulfonated dispersant and the anion which is capable of forming a low-solubility salt with the metal cation are mixed first, and then the metal cation is added. To adjust the pH it is then possible to add an acid or base. The components are mixed generally at a temperature in the range from 5 to 80° C., usefully 10 to 40° C., and more particularly at room temperature (about 20-30° C.).

An additive of the invention for hydraulically setting compositions may also be obtained by dispersing a freshly precipitated salt of the metal cation in the presence of the polymeric sulfonated dispersant, to give a colloidally disperse preparation of the salt. Freshly precipitated here means immediately subsequent to the precipitation, i.e. within about 5 minutes, preferably 2 minutes or 1 minute.

The preparation may take place continuously or batchwise. The mixing of the components is accomplished in general in a reactor with a mechanical stirring mechanism. The stirring speed of the stirring mechanism may be between 10 rpm and 2000 rpm. An alternative option is to mix the solutions using a rotor-stator mixer, which may have stirring speeds in the range from 1000 to 30 000 rpm. Furthermore, it is also possible to use different mixing geometries, such as a continuous process in which the solutions are mixed using a Y-mixer, for example.

If desired, a further step in the method may follow, for the drying of the additive. Drying may be accomplished by roll drying, spray drying, drying in a fluidised bed process, by bulk drying at elevated temperature, or by other customary drying methods. The preferred range of the drying temperature lies between 50 and 230° C.

The additive of the invention for hydraulically setting compositions may be used as a slump retainer in water-containing building material mixtures which comprise a hydraulic binder, the hydraulic binder being selected from (Portland) cement, slag sand, flyash, silica dust, metakaolin, natural pozzolans, burnt oil shale, calcium aluminium cement, and also binders based on calcium sulfate such as α-hemihydrate, α/β-hemihydrate, β-hemihydrate, natural anhydrite, synthetic anhydrite, anhydrite obtained from flue-gas desulfurization, and/or mixtures of two or more of these components.

The concept of the slump retainer in this application means that the additives, over a processing life of up to 90 minutes, preferably up to 60 minutes, after the mixing of the building material mixture with water, produce a slump of the binder suspension that is as sufficient as possible for the conditions of the application case in question, is extremely high and in particular does not drop substantially over the aforementioned time period. The additives make it possible to set a profile of properties which is tailored to the respective application. Moreover, it is possible to add the additive not only during mortar or concrete production but instead during production of the cement itself. In that case the additive at the same time fulfils the function of a grinding assistant.

The concrete additives, in addition to the colloidally disperse preparation of the invention, comprising polymeric sulfonated dispersant, metal cation and anion, may also comprise further components. These further components include water-reducing plasticizers such as, for example, conventional polycarboxylate ethers, and also defoamers, air pore formers, retarders, shrinkage reducers and/or hardening accelerators.

The invention also relates to a building material mixture which comprises at least one additive of the invention and at least one binder. The binder is preferably selected from (Portland) cement, slag sand, fly ash, silica dust, metakaolin, natural pozzolans, burnt oil shale, calcium aluminium cement, and also binders based on calcium sulfate such as α-hemihydrate, α/β-hemihydrate, β-hemihydrate, natural anhydrite, synthetic anhydrite, anhydrite obtained from flue-gas desulfurization, and/or mixtures thereof. In addition the building material mixture may comprise customary constituents, such as curing accelerators, curing retarders, clay modifiers, shrinkage reducers, corrosion inhibitors, strength enhancers, water reducers, etc.

The addition of additive of the invention amounts in general to 0.1% to 5% by weight as a solid, based on the cement content of the building material mixture. It may be added as an aqueous colloidally disperse preparation or as a dried solid, in the form of a powder, for example.

EXAMPLES

General Synthesis Instructions

Polymers used: the melamine-formaldehyde-sulfonate condensate Melment L10 and the β-naphthalenesulfonate-formaldehyde condensate Melcret 500L are commercial products from BASF Construction Solutions GmbH. Na lignosulfonate ($M_w$ 52 kDa, $M_n$ 7 kDa) was acquired from Sigma-Aldrich. The sulfonated acetone-formaldehyde condensate (AFS) was synthesized as follows:

35.0 g of sodium sulfite are introduced into 50 g of water in a three-necked flask with intensive reflux condenser, and stirred together thoroughly. Then 29 g of acetone are added. The solution is heated to 56° C. Then 117 g of 37% strength formaldehyde solution are slowly added dropwise, at a rate such that the temperature does not exceed 60° C. After the end of the addition, the solution is heated to 90° C. and stirred at that temperature for 1 hour. After cooling, it is neutralized with 50% strength sodium hydroxide solution. A red-brown solution with a strength of 40% is obtained. The molecular weight is 19 000 g/mol.

The charge density is calculated from the initial masses, i.e.

n($SO_3^-$)=35 g/126.04 g/mol=0.278 mol; accordingly, 0.278 mol of charges on a total solids of 35.0 g+29 g+117*0.37=107.3 g gives a charge density of 0.278 mol/107.3 g=2.59 mmol/g.

The charge density of Na lignosulfate was calculated on the basis of the idealized structural formula of the lignosulfonate monomer indicated below (after P. R. Gupta, J. L. McCarthy, Macromolecules 1968, 1, 495-498). Consequently, with $z_{S,sulfonate}=1$, the resulting charge density is 3.76 mmol/g polymer.

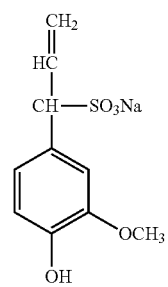

TABLE 1

Physical data of the reference polymers

| | V1 Melment L10 | V2 Na-lignosulfonate | V3 acetone condensate (AFS) |
|---|---|---|---|
| $\Sigma_j z_{S,j} \times n_{s,j}$ in mmol per gram of polymer | 4.29 | 3.76 | 2.59 |

General Instructions for Synthesizing the Additives

The aqueous solutions of the polymers are mixed with the metal cation salts of the invention, with the anion compounds of the invention, and also, optionally, with a base or acid for adjusting the pH, with stirring. Mixing is carried out in a 1 l jacketed glass reactor with paddle stirrer, temperature-conditioned at 20° C., at 300 rpm. The sequence of the addition is indicated in Table 2 by a letter code. P stands for the aqueous solution of the polymer, K for the metal cation salt of the invention, A for the anion compound of the invention, and B and S for base and acid, respectively. The amounts are always based on the solid contents. The final pH of the resulting solutions or suspensions is likewise indicated.

The metered additions of the respective components can be made quickly, in other words with a metering rate in the range of kg/s (for example, by rapid addition of a glass beaker with an aqueous solution of the respective component), or the respective components can be metered in slowly by means of controlled metering, by means of a perfusor pump, for example, in the g/h range.

TABLE 2

Composition of the additives 1-10

| No. | Polymer | Metal salt | Anion compound | Base/acid | pH | Sequence | Water (% by weight) | Polymer (% by weight) | Metal salt (% by weight) | Anion compound (% by weight) | Base/acid (% by weight) | $\dfrac{\sum_i z_{K,i} * n_{K,i}}{\sum_j z_{S,j} * n_{S,j}}$ | $\dfrac{\sum_l z_{A,l} \times n_{A,l}}{\sum_i z_{K,i} \times n_{K,i}}$ |
|---|---|---|---|---|---|---|---|---|---|---|---|---|---|
| 1 | lignosulfonate | Ca(NO$_3$)$_2$ | NaAlO$_2$ | — | 10.2 | PKA | 87.3 | 6.5 | 4.9 | 1.2 | — | 2.44 | 0.25 |
| 2 | Melment L10 | Ca(NO$_3$)$_2$ | NaAlO$_2$ | HNO$_3$ | 11.1 | PKAS | 75.8 | 9.3 | 9.8 | 4.9 | 0.2 | 3 | 0.5 |

TABLE 2-continued

Composition of the additives 1-10

| No. | Polymer | Metal salt | Anion compound | Base/acid | pH | Sequence | Water (% by weight) | Polymer (% by weight) | Metal salt (% by weight) | Anion compound (% by weight) | Base/acid (% by weight) | $\sum_i \frac{z_{K,i} * n_{K,i}}{\sum_j z_{S,j} * n_{S,j}}$ | $\sum_l \frac{z_{A,l} \times n_{A,l}}{\sum_j z_{K,i} \times n_{K,i}}$ |
|---|---|---|---|---|---|---|---|---|---|---|---|---|---|
| 3 | AFS | $Ca(NO_3)_2$ | $NaAlO_2$ | $HNO_3$ | 10.5 | PKAS | 69.7 | 15.3 | 9.7 | 4.9 | 0.4 | 3 | 0.5 |
| 4 | AFS | $Ca(NO_3)_2$ | $NaAlO_2$ | $HNO_3$ | 12.0 | PKAS | 79.1 | 11.8 | 5.0 | 3.8 | 0.3 | 2 | 0.75 |
| 5 | AFS | $Ca(NO_3)_2$ | $NaAlO_2$ | $HNO_3$ | 11.1 | PKAS | 74.1 | 11.8 | 10.0 | 3.8 | 0.3 | 4 | 0.38 |
| 6 | AFS | $Ca(NO_3)_2$ | $NaAlO_2$ | $HNO_3$ | 10.5 | PKAS | 79.2 | 11.8 | 7.5 | 1.3 | 0.2 | 3 | 0.17 |
| 7 | AFS | $Sr(NO_3)_2$ | $NaAlO_2$ | $HNO_3$ | 11.4 | PKAS | 77.5 | 7.6 | 7.9 | 2.4 | 4.6 | 3 | 0.5 |
| 8 | AFS | $Zn(NO_3)_2$ | $NaAlO_2$ | NaOH | 10.2 | PKAB | 68.9 | 12.1 | 13.9 | 3.8 | 1.3 | 3 | 0.5 |
| 9 | AFS | $Mg(NO_3)_2$ | $NaAlO_2$ | NaOH | 10.5 | PKAB | 77.4 | 12.0 | 7.9 | 1.3 | 1.4 | 2 | 0.25 |
| 10 | AFS | $Al(NO_3)_3$ | $H_3PO_4$ | $NH_4OH$ | 4 | PKAB | 69.4 | 11.7 | 17.1 | 0.7 | 1.1 | 4.5 | 0.17 |

Application Tests

Mortar Tests

The mortar tests used were standard mortar tests in accordance with DIN EN 1015 using Bernburg cement CEM I 42.5 R and a w/c of 0.42. The weight ratio of sand to cement was 2.2 to 1. A mixture of 70% by weight standard sand (Normensand GmbH, D-59247 Beckum) and 30% by weight quartz sand was used. Prior to testing in the mortar, the polymer samples were defoamed using 1% by weight of triisobutyl phosphate, based on the polymer solids content.

The spread is obtained by shaking the slump flow table, in accordance with the aforementioned DIN method, by raising and impacting 15 times. The shearing forces which occur as a result of the tapping caused further spreading of the mortar. The diameter of the mortar cake after tapping is identified as the spread.

The addition figures reported are based always on the solids content of the polymer suspensions used, not on the active polymer content.

Mixing Process

The dried aggregates as per grading curve, and the cement, are introduced into a forced mixer and mixed for 10 seconds. The mixture in the forced mixer is thereafter moistened with 10% of the total water, and mixing is continued for a further 2 minutes. Thereafter the remainder of the water is added, and mixing is continued for 1 minute more. Lastly the additive of the invention is added, followed by mixing for 1 minute again.

The slump value is a measure of the extent to which the concrete cake collapses after the metal cone is lifted (difference in height between the top edge of the metal cone and the height of the concrete cake after removal of the metal mould). The slump flow corresponds to the base diameter of the concrete cake after collapse.

The spread is obtained by shaking the slump flow board, in accordance with the abovementioned DIN method, by

TABLE 3

Mortar results, Bernburg cement, w/c 0.42

| Additive No. | Base polymer | Addition [%] | Spread [cm] 4 min | 10 min | 30 min | 60 min | 90 min | Delta 30-4 [cm] | Delta 60-4 [cm] |
|---|---|---|---|---|---|---|---|---|---|
| V1 | Melment L10 | 0.5 | 28.9 | 27.1 | 24.3 | 21.7 | | −4.6 | −7.2 |
| V2 | Na lignosulfonate | 0.6 | 25.3 | 24.2 | 19.8 | | | −5.5 | |
| V3 | AFS | 0.5 | 26.8 | 25.4 | 22.4 | 20.6 | 19.7 | −4.4 | −6.2 |
| 1 | Na lignosulfonate | 2.5 | 16.5 | 18.2 | 19.8 | 19.7 | | | +3.2 |
| 2 | Melment L10 | 2.2 | 17.4 | 26.4 | 27.5 | 25.3 | 22.7 | +10.1 | +7.9 |
| 3 | AFS | 1.5 | 17.1 | 26 | 27.8 | 25.1 | 22.5 | +10.7 | +8.0 |
| 4 | AFS | 1.7 | 17.9 | 26.8 | 27.3 | 24.2 | 22.7 | +9.4 | |
| 5 | AFS | 1.7 | 17 | 26.8 | 27.9 | 25 | 22.2 | +10.9 | +8.0 |
| 6 | AFS | 1.2 | 23.7 | 29.2 | 28.3 | 25.5 | 23.3 | +4.6 | +1.8 |
| 7 | AFS | 1.5 | 17.7 | 24.6 | 25 | 23.3 | 21.6 | +7.3 | +5.6 |
| 8 | AFS | 1.7 | 18.5 | 22.9 | 20 | | | +1.5 | |
| 9 | AFS | 2.0 | 14.2 | 14.4 | 14.8 | | | +0.6 | |
| 10 | AFS | 1.5 | 16.7 | 17.2 | 17.8 | 17.2 | 17 | +1.1 | +0.5 |

Concrete Tests

Concrete tests conducted were standard concrete tests in accordance with DIN EN 12350 with a cement content of 380 kg. The grading curve set corresponds to the A/B 16 classification according to DIN 1045-2. The cement used was Bernburg CEM I 42.5 R, with a w/c of 0.44. Prior to testing in the concrete, the polymer samples were defoamed with 1% by weight of triisobutyl phosphate, based on the polymer solids content.

raising and impacting 15 times. The shearing forces which occur as a result of the tapping produce a further spread of the concrete. The diameter of the concrete cake after tapping is identified as the spread.

The additions reported are based in each case on the solids content of the polymer suspensions used, not on the active polymer content.

The results are summarized in Table 4 below.

TABLE 4

Results of the concrete tests, cement: Bernburg CEM I 42.5 R, w/c = 0.44

| No. | Plasticizer | Addition % | Air % | Slump in cm | | | | Slump flow in cm | | | |
|---|---|---|---|---|---|---|---|---|---|---|---|
| | | | | 0 min | 10 min | 30 min | 60 min | 0 min | 10 min | 30 min | 60 min |
| | Na lignosulfonate | 0.65 | 1.40 | 19.0 | 14.5 | 6.5 | 4.0 | 30.0 | 27.0 | 21.0 | 20.0 |
| | Melment L10 | 0.5 | 1.70 | 21.0 | 16.0 | 5.0 | 2.0 | 36.5 | 28.0 | 20.5 | 20.0 |
| | AFS | 0.55 | 1.60 | 24.0 | 21.5 | 5.0 | 2.0 | 46.0 | 35.0 | 20.5 | 20.0 |
| 1 | Na lignosulfonate | 2.40 | 1.65 | 1.0 | 1.5 | 5.0 | 5.0 | 20.0 | 20.0 | 20.5 | 20.5 |
| 2 | Melment | 3.40 | 1.25 | 0.0 | 15.0 | 23.0 | 15.0 | 20.0 | 27.0 | 43.0 | 27.5 |
| 3 | AFS | 1.60 | 1.55 | 1.0 | 4.0 | 22.5 | 16.0 | 20.0 | 20.0 | 38.5 | 28.0 |

| No. | Plasticizer | Spread in cm | | | | Delta spread | | Compressive strength 24 h |
|---|---|---|---|---|---|---|---|---|
| | | 0 min | 10 min | 30 min | 60 min | 10-0 min | 30-0 min | N/mm$^2$ |
| | Na lignosulfonate | 51.0 | 47.0 | 43.0 | 37.0 | −4.0 | −8.0 | 3.65 |
| | Melment L10 | 56.0 | 49.0 | 42.5 | 38.0 | −7.0 | −13.5 | 26.45 |
| | AFS | 58.5 | 52.5 | 41.5 | 38.0 | −6.0 | −17.0 | 25.65 |
| 1 | Na lignosulfonate | 36.0 | 38.5 | 41.0 | 40.0 | +2.5 | +5.0 | — |
| 2 | Melment | 36 | 50.0 | 56.0 | 45.0 | +14.0 | +20.0 | 24.0 |
| 3 | AFS | 36.0 | 42.0 | 55.0 | 45.0 | +6.0 | +19.0 | 24.6 |

As the mortar and concrete results show, the additives of the invention produce retention of consistency for longer, across the board, than additives comprising the unmodified sulfonated polymeric dispersants.

The concrete strengths after 24 h for the inventively modified comb polymers are very close to the strength of the unmodified reference. This proves the outstanding suitability of the inventive preparations as slump retainers with excellent early-strength development.

Additives 11 to 18 were synthesized according to the general instructions given above. Their composition is summarized in Table 5 below.

Application Tests

The additives were used in mortar tests which were standard mortar tests in accordance with DIN EN 1015 using Mergelstetten cement CEM I 42.5 R and a w/c of 0.425. The weight ratio of sand to cement was 2.2 to 1. A mixture of 70% by weight standard sand (Normensand GmbH, D-59247 Beckum) and 30% by weight quartz sand was used. Prior to testing in the mortar, the polymer samples were defoamed using 1% by weight of triisobutyl phosphate, based on the polymer solids content. The tests were carried out as described above and the results are given in Table 6 below.

TABLE 5

Composition of the additives nos. 11-18

| No. | Polymer | Metall-Salze | Anion-Verb. | Base/Säure | pH | Reihen-folge | Wasser (M %) |
|---|---|---|---|---|---|---|---|
| 11 | Clayton | Mg(NO$_3$)$_2$ | NaAlO$_2$ | NaOH | 10.7 | PKAB | 77.7 |
| 12 | Clayton | Mg(NO$_3$)$_2$ | NaAlO$_2$ | NaOH | 10.7 | PKAB | 78.2 |
| 13 | Clayton | Ca(NO$_3$)$_2$ | NaAlO$_2$ | HNO$_3$ | | PKAB | 83.3 |
| 14 | Clayton | Ca(NO$_3$)$_2$ | NaAlO$_2$ | HNO$_3$ | 10.9 | PAKS | 83.0 |
| 15 | Clayton | Ca(NO$_3$)$_2$ | NaAlO$_2$ | HNO$_3$ | 10.9 | PAKS | 82.8 |
| 16 | Clayton | Ca(NO$_3$)$_2$ | NaAlO$_2$ | — | 10.8 | PAK | 77.8 |
| 17 | Clayton | Ca(NO$_3$)$_2$ | NaAlO$_2$ | — | 11.0 | PAK | 80.8 |
| 18 | Clayton | Ca(NO$_3$)$_2$ | NaAlO$_2$ | HNO$_3$ | 11.0 | PAKS | 80.5 |

| No. | Polymer (M %) | Metall-Salz (M %) | Anion-Verb. (M %) | Base/Säure (M %) | $\dfrac{\sum_i z_{K,i} * n_{K,i}}{\sum_j z_{S,j} * n_{S,j}}$ | $\dfrac{\sum_l z_{A,l} * n_{A,l}}{\sum_j z_{K,j} * n_{K,j}}$ |
|---|---|---|---|---|---|---|
| 11 | 11.9 | 7.9 | 1.0 | 1.5 | 2.0 | 0.2 |
| 12 | 11.8 | 7.8 | 0.5 | 1.7 | 2.0 | 0.1 |
| 13 | 11.0 | 4.7 | 0.9 | 0.1 | 2.0 | 0.2 |
| 14 | 11.0 | 4.7 | 1.2 | 0.2 | 2.0 | 0.25 |
| 15 | 11.0 | 4.7 | 1.4 | 0.2 | 2.0 | 0.30 |
| 16 | 12.9 | 8.2 | 1.1 | 0 | 3.0 | 0.13 |
| 17 | 11.0 | 7.0 | 1.2 | 0 | 3.0 | 0.17 |
| 18 | 11.0 | 7.0 | 1.4 | 0.1 | 3.0 | 0.2 |

TABLE 6

Mortar results, cement Mergelstetten CEM I 42.5 R, w/c = 0.425

| Additive No. | Dosage [%] | Spread [cm] | | | | | Delta 30-4 [cm] | Delta 60-4 [cm] |
|---|---|---|---|---|---|---|---|---|
| | | 4 min | 10 min | 30 min | 60 min | 90 min | | |
| 11 | 1.03 | 16.5 | 16.9 | 16.6 | | | +0.1 | — |
| 12 | 1.03 | 15.2 | 15.4 | 15.1 | | | -0.1 | — |
| 13 | 1.2 | 20.5 | 28.8 | 27.7 | 26.3 | 24.8 | +7.2 | +4.3 |
| 14 | 1.2 | 22.6 | 28.1 | 27.9 | 25.6 | 23.2 | +5.3 | +0.8 |
| 15 | 1.2 | 18.2 | 27.6 | 27 | 24.1 | 22.8 | +8.8 | +4.6 |
| 16 | 1.2 | 29.8 | 27.2 | 26.1 | 23.1 | 21.4 | -3.7 | -8.4 |
| 17 | 1.2 | 21.3 | 26.6 | 25.5 | 22.7 | 20.6 | +4.2 | -0.7 |
| 18 | 1.2 | 19.3 | 25.8 | 26 | 22.2 | 19.9 | +6.7 | +0.6 |
| 19 | 1.3 | 22.8 | 27.4 | 27.1 | 26.2 | 25.1 | +4.3 | +2.3 |
| 20 | 1.8 | 23.9 | 28.8 | 27.8 | 27.7 | 27.6 | +3.9 | +3.7 |
| 21 | 1.4 | 21.2 | 27.2 | 27.8 | 27.8 | 27.7 | +6.6 | +6.5 |

The invention claimed is:

1. An additive for hydraulically setting compositions, comprising a colloidally disperse preparation of at least one salt of a mono- or polyvalent metal cation, at least one compound which is able to release an anion which forms a low-solubility salt with the metal cation, and a dispersant comprising 70 to 100% by weight of the total dispersant of a polymeric sulfonated dispersant having anionic and/or anionogenic groups which is selected from sulfonated ketone-formaldehyde condensates, sulfonated melaminesulfonate-formaldehyde condensates, naphthalenesulfonate-formaldehyde condensates, lignosulfonates and sulfonated copolymers obtained by radical copolymerization and where the metal cation is selected from $Ca^{2+}$, $Al^{3+}$, $Fe^{3+}$, $Fe^{2+}$, $Zn^{2+}$, $Mn^{2+}$, $Cu^{2+}$, $Mg^{2+}$, $Sr^{2+}$, $Ba^{2+}$, $Li^+$, and mixtures thereof, and where the metal cation is present in a quantity such that the following condition (a) is met:

$$0.1 < \frac{\sum_i z_{K,i} * n_{K,i}}{\sum_j z_{S,j} * n_{S,j}} < 30 \quad (a)$$

where $z_{K,i}$ is the amount of the charge number of the metal cation, $n_{K,i}$ is the number of mols of the weighed-in metal cation, $z_{S,j}$ is the amount of the charge number of the anionic and anionogenic groups present in the polymeric dispersant, $n_{S,j}$ is the number of mols of the anionic and anionogenic groups present in the weighed-in polymeric sulfonated dispersant, the indices i and j are independent of one another and are an integer greater than 0, where i is the number of different kinds of metal cations and j is the number of different kinds of anionic and anionogenic groups present in the polymeric dispersant.

2. The additive according to claim 1, where at least one metal cation and at least one anion are present in an amount calculated according to the following formulae:

$$0.01 \leq \frac{\sum_l z_{A,l} \cdot n_{A,l}}{\sum_i z_{K,i} \cdot n_{K,i}} < 3 \quad (b)$$

where $z_{K,i}$ is the amount of the charge number of the metal cation, $n_{K,i}$ is the number of mols of the weighed-in metal cation, $z_{A,l}$ is the charge number of the weighed-in anion, $n_{A,l}$ is the number of mols of the weighed-in anion, the indices i and l are independent of one another and are an integer greater than 0, i is the number of different kinds of metal cations and l is the number of different kinds of anions which are able to form a low-solubility salt with the metal cation.

3. The additive according to claim 1, where the anion is selected from an aluminate, a phosphate and a silicate.

4. The additive according to claim 1, where the cation is selected from $Ca^{2+}$, $Al^{3+}$, $Fe^{3+}$, and $Mg^{2+}$.

5. The additive according to claim 1, further comprising at least one neutralizing agent.

6. The additive according to claim 5, where the neutralizing agent is an organic monoamine, polyamine, ammonia or an alkali hydroxide.

7. The additive according to claim 1, having a pH of 2 to 13.

8. The additive according to claim 1, where the polymeric sulfonated dispersant is the sole dispersant or where the dispersant additionally comprises at least one polymeric dispersant comprising anionic and/or anionogenic groups and polyether side chains.

9. The additive according to claim 8, where the dispersant comprises 70 to 90% by weight of polymeric sulfonated dispersant and 10 to 30% by weight of the polymeric dispersant comprising anionic and/or anionogenic groups and polyether side chains.

10. The additive according to claim 1, obtained by precipitating the salt of the polyvalent metal cation in the presence of the polymeric sulfonated dispersant, to give a colloidally disperse preparation of the salt, or obtained by dispersing a freshly precipitated salt of the polyvalent metal cation in the presence of the polymeric sulfonated dispersant, to give a colloidally disperse preparation of the salt.

11. The additive according to claim 10, where a neutralizing agent is added to the colloidally disperse preparation.

12. The additive according to claim 1, obtained by peptizing a hydroxide and/or oxide of the polyvalent metal cation with an acid, to give a colloidally disperse preparation of the salt of the polyvalent metal cation.

13. A process for preparing the additive for hydraulically setting compositions according to claim 1, where the salt of the polyvalent metal cation is precipitated in the presence of the polymeric sulfonated dispersant, to give a colloidally disperse preparation of the salt, or where a freshly precipitated salt of the polyvalent metal cation is dispersed in the presence of the polymeric sulfonated dispersant, to give a colloidally disperse preparation of the salt.

14. A process comprising adding the additive for hydraulically setting compositions according to claim 1 as a slump retainer in water-containing building material mixtures which comprise a hydraulic binder.

15. The process according to claim 14, where the hydraulic binder is selected from cement, slag sand, fly ash, silica dust, metakaolin, natural pozzolans, burnt oil shale, calcium aluminate cement, calcium sulfate-based binders and/or mixtures of two or more thereof.

16. A building material mixture comprising the additive according to claim 1 and a binder selected from cement, slag sand, fly ash, silica dust, metakaolin, natural pozzolans, burnt oil shale, calcium aluminate cement, calcium sulfate-based binders and/or mixtures of two or more thereof.

17. The additive according to claim 1, wherein the dispersant comprises 80 to 100% by weight of the total dispersant of the polymeric sulfonated dispersant.

18. The additive according to claim 1, wherein the dispersant comprises 90 to 100% by weight of the total dispersant of the polymeric sulfonated dispersant.

19. The additive according to claim 8, where the dispersant comprises 80 to 90% by weight of polymeric sulfonated dispersant and 10 to 20% by weight of the polymeric dispersant comprising anionic and/or anionogenic groups and polyether side chains.

20. The additive according to claim 12, where the acid is selected from boric acid, carbonic acid, oxalic acid, silicic acid, polyphosphoric acid, sulfuric acid, phosphoric acid, phosphorous acid, an $Al^{3+}$ hexaaquo complex and/or an $Fe^{3+}$ hexaaquo complex.

* * * * *